Aug. 20, 1963  A. W. McKEE, JR  3,101,241
METHOD OF PREPARING PARTICLES OF THERMOPLASTIC COMPOSITION
Filed Nov. 3, 1960
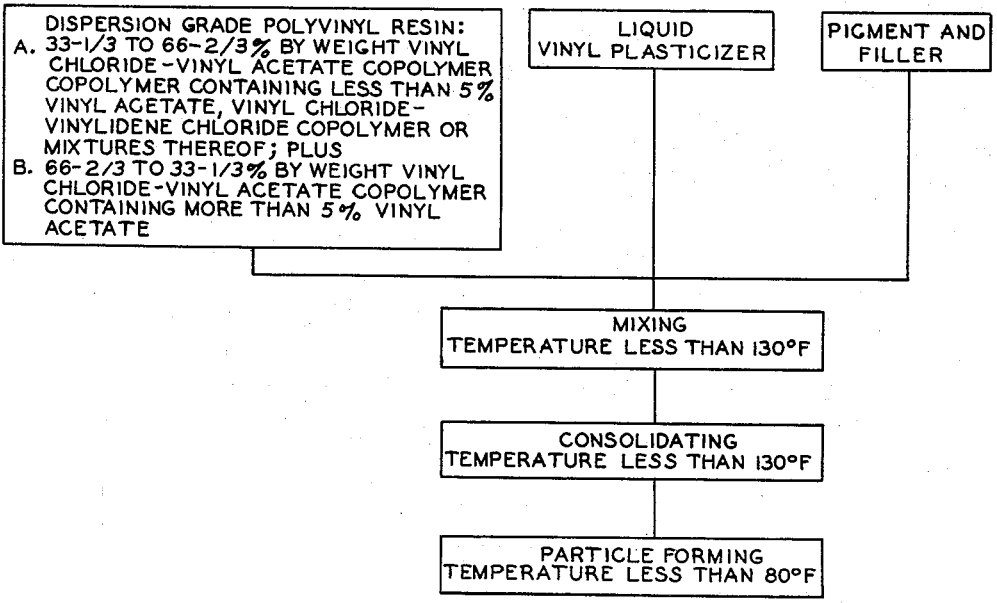
*INVENTOR.*
ALLAN W. McKEE, JR.
BY *William H. Taylor* though the jacket during mixing, the temperature being maintained less than about 130° F. The blended mix, when charged to the rolls of the consolidating mill, is cooled to a temperature less than about 130° F. during consolidation by means of cooling water circulated through the channels in the rolls. The rolls of the mill in which the mix is consolidated are preferably driven at constant equal speeds. The action thereby achieved is one of consolidation without mixing, and no banding, or only a very minimum amount of banding, may be tolerated during the consolidation step. The consolidated sheet is fed to a knife cutter, grinder, or other suitable mechanism to form particles, and the rate of feed is adjusted to prevent heat build-up during the particle-forming operation, and the temperature of the mix is preferably maintained at less than about 80° F. When the rate at which the consolidated sheet is fed is such that heat build-up occurs, the consolidated mix being formed into suitable sized particles and the particles themselves are cooled by appropriate means, such as by the use of cool carbon dioxide gas.

3,101,241
METHOD OF PREPARING PARTICLES OF THERMOPLASTIC COMPOSITION

Allan W. McKee, Jr., Millersville, Pa., assignor to Armstrong Cork Company, Lancaster, Pa., a corporation of Pennsylvania
Filed Nov. 3, 1960, Ser. No. 66,910
3 Claims. (Cl. 18—47.5)

This invention relates to a method for preparing particles of thermoplastic composition suitable for use in a stencil operation for the manufacture of resilient surface coverings and the like and more particularly relates to a method of for preparing novel polyvinyl resin-containing particles which are nondusting and which have good compressibility and cohesion.

The use of polyvinyl resins in the manufacture of resilient surface covering materials, such as floor coverings, has found wide acceptance in industry. Linoleum-type resilient floor products have always enjoyed a substantial share of the flooring industry sales; however, in recent years, flooring products manufactured from the newer type polyvinyl resins have gained wide acceptance so that today a large percentage of resilient floors is manufactured from these synthetic resinous materials. The synthetic polyvinyl resins are particularly well adapted to continuous production techniques wherein relatively high temperatures and pressures are utilized in consolidating and fusing the thermoplastic surface layer. To present date, however, the use of thermoplastic resins, such as vinyls, in compositions adapted for use in stencil operations for producing resilient flooring products having the novel designs achievable with a stencil-type lay-up, has presented serious drawbacks. By way of example, readily available thermoplastic mixes for use in such operations are deficient in that the plastic mixes prepared in accordance with known methods exhibit excess dust, lack in compressibility, and suffer from noncohesion.

The primary object of this invention is to provide particles of thermoplastic composition of such composition and physical properties as to make them suitable for use in a stencil lay-up for the preparation of resilient surface coverings.

Another object of this invention is to provide a method for preparing particles of thermoplastic resin-containing composition which are nondusting, compressible, and cohesive and which are especially adapted for use in the production of molded, inlaid floor products.

These and other objects of this invention will become apparent from the description which follows wherein examples of specific embodiments of this invention are set forth.

In the drawing the FIGURE is a flow sheet setting forth the various essential steps of the process.

In accordance with this invention, particles of thermoplastic resin-containing compositions having good compressibility and cohesion are prepared by mixing powdered polyvinyl resins and liquid plasticizers together with suitable amounts of stabilizers, fillers, and pigment; consolidating the mix thus prepared to form a sheet of plastic composition; and breaking up the consolidated sheet into particles of the desired size.

During the prepartion of the mix, I have found it to be essential to keep the various ingredients cool throughout all parts of the mixing, consolidating, and particle-forming operations, thus preventing premature fusion of the mix and loss of its novel properties. Thus, in mixing, the mixer initially used to blend the liquid plasticizer, powdered polyvinyl resin, filler, pigment, and stabilizer is preferably jacketed and cooled by circulating cooling water By insuring that the mixing, consolidation, and particle formation are done at a relatively low temperature, the individual particles of powdered thermoplastic resin become coated with the liquid plasticizer without the plasticizer becoming diffused throughout the particle, thus insuring against premature fusion of the resin. The additional ingredients which are added to form the particles of thermoplastic composition, such as the filler, pigment, and stabilizer, are nonreactive with the liquid plasticizer so that the temperature control is primarily designed to control the proper degree of mixing of liquid plasticizer with the powdered resin.

The thermoplastic particles prepared as above described may be used in the preparation of multistencil patterns similar to those formed in linoleum products by stencil lay-up techniques without the previous restrictions imposed by commercially available thermoplastic compositions. The particles form a mix which compresses and handles in much the same manner as linoleum mix and is particularly well adapted for forming mottled mixes which may be fed to stencils through regular stricklers after which the mix may be readily consolidated and fused under heat and pressure to form a resilient surface covering.

Essentially, my invention involves the use of copolymers of vinyl chloride and vinyl acetate and copolymers of vinyl chloride and vinylidene chloride which have been formed by a dispersion polymerization process and which are identifiable by the fact that they are supplied as fine powders and at room temperature will not readily form a dispersion or colloidal suspension. These materials are well known to those skilled in the art and are supplied under various trade names, such as Geon 202 of Goodrich, a copolymer of vinyl chloride and vinylidene chloride, and VYNW and VYHH of Bakelite, copolymers of vinyl chloride and vinyl acetate.

It has been found possible to prepare the novel mixes of this invention with any suitable liquid plasticizer for vinyl-type resins. By way of example, it has been found that epoxidized soya oil, dioctyl phthalate, butyl benzyl phthalate, tricresyl phosphate, chlorinated paraffin, and mixed isomeric terpenes are all suitable for use in the practice of this invention.

The fillers and pigments contemplated for use in the practice of this invention are of the well-known inert, inorganic types commonly used in compounding and coloring polyvinyl resin compositions.

In addition, it is contemplated that suitable quantities of vinyl-type resin stabilizers will be utilized. Thus, such stabilizers as the fatty acid salts of barium and cadmium, i.e. barium-cadmium laurates and barium-cadmium stearates and other vinyl stabilizers equally well known to those skilled in the art, might be used.

Based upon 100 parts by weight of powdered vinyl resin, 20–50 parts by weight of liquid vinyl plasticizer, and 0–150 parts by weight of inert pigment and filler may be mixed, consolidated, and broken up to form particles of plastic mix suitable for stencil-type molded, inlaid production. The powdered vinyl resin preferably consists essentially of from about 33⅓%–66⅔% by weight of relatively hard, partially crystalline copolymers of vinyl chloride and vinyl acetate, copolymers of vinyl chloride and vinylidene chloride and mixtures thereof and from about 66⅔%–33⅓% by weight of relatively softer copolymers of vinyl chloride and vinyl acetate. By relatively hard, partially crystalline copolymers of vinyl chloride and vinyl acetate is meant copolymers containing less than about 5% vinyl acetate. Copolymers of vinyl chloride and vinyl acetate containing more than about 5% vinyl acetate are generally relatively softer and are capable of being processed at low temperatures. Commercial copolymers containing up to about 15% vinyl acetate are available and these relatively softer copolymers having higher amounts of vinyl acetate in the copolymer are preferred as the second component although this is dependent to a considerable extent on the proportioning of the vinyl components.

The following examples will serve to illustrate specific embodiments of this invention. In the examples, the temperature of the mix during all steps was maintained at about room temperature, or about 75° F.

EXAMPLE 1

*Batch Formulation*

Ingredients: Parts by weight
Powdered dispersion grade copolymer of 97.5% vinyl chloride and 2.5% vinyl acetate (Bakelite VYNW) _____ 100.0
Powdered dispersion grade copolymer of 86% vinyl chloirde and 14% vinyl acetate (Bakelite VYHH) _____ 200.0
Liquid vinyl plasticizer-epoxidized soya oil (Rohm & Haas Paraplex G-62) _____ 60.0
Liquid vinyl plasticizer-dioctyl phthalate ____ 20.0
Vinyl stabilizer, phenyl phosphite _____ 7.5
Vinyl stabilizer, barium-cadmium caprate ____ 2.0

The powdered polyvinyl resin is charged into a low intensity, dough-type mixer, a Day mixer which is jacketed and cooled by means of tap water, along with the vinyl stabilizers. The mixer is then started, and the liquid plasticizer is metered in at a rate of 1–2 gallons per minute. Mixing is continued for a period of 20 minutes at which point the liquid plasticizer and the various dry ingredients are completely blended, and the mix is in the form of small agglomerates and some finer resin particles.

The agglomerates and particles thus formed are fed between two cold 14″ mill rolls which are maintained cool by circulating tap water through drilled holes in the rolls. Each roll is driven at an equal constant rate. After passing between the rolls, the mix, in the form of a sheet of consolidated material, is removed using suitable doctor blades. The consolidated sheet of mix is then fed directly into a Fitzpatrick comminuting machine wherein the sheet is ground or cut into the desired particle size by the knives contained therein. The consolidated sheet is fed from the cold roll mill at a rate of approximately 1,000–2,000 pounds per hour to form particles which do not adhere together and which readily transfer through the Fitzpatrick comminuting machine into pans in which the mix is gathered prior to delivery to the stencil apparatus. All particles of mix thus prepared passed through a 10-mesh screen.

Where the throughput is greater, it has been found that some heat will be generated in the Fitzpatrick comminuting machine due to a build-up of particles near the cutting blades, and this build-up of heat in turn causes some consolidation of the particles. This is readily overcome by maintaining an atmosphere of cooled $CO_2$ gas in the machine to prevent any heat build-up and, in turn, to prevent agglomeration of any of the particles of plastic composition formed therein.

The foregoing example illustrates a specific embodiment of this invention in forming particles of plastic mix suitable for use in stencil-type lay-ups. The mix thus formed, when subjected to heat and pressure, forms a clear vinyl.

EXAMPLE 2

Using a commercial B & Z-type mixer, 200 pounds of a powdered copolymer of vinyl chloride and vinyl acetate containing about 97.5% polyvinyl chloride and 2.5% polyvinyl acetate, and 400 pounds of a powdered copolymer containing about 86% polyvinyl chloride and 14% polyvinyl acetate are charged through the hopper, and 240 pounds of a preblended mix comprising 95 pounds of epoxidized soya oil liquid vinyl plasticizer (Rohm & Haas Paraplex G-62), 40 pounds of dioctyl phthalate liquid vinyl plasticizer, 30 pounds of a barium-cadmium soap-type vinyl stabilizer (National Lead Co. Flomax 25), and 50 pounds of inert, $TiO_2$ inorganic pigment dispersed in 25 pounds (Rohm & Haas Paraplex G-62) liquid vinyl plasticizer are charged through the back door of the mixer. The mixer is provided with a water jacket and kept cool by circulating chilled water through the jacket during the mixing operation. During mixing, the rotors in the mixer are reversed every 3–5 minutes, and the ingredients are mixed for a total period of from 12–15 minutes and then discharged at which point the plastic mix was in the form of very small pieces or agglomerates. As in Example 1, the material discharged from the B & Z-type mixer is fed between two cold 14″ mill rolls and removed therefrom in the form of a consolidated sheet by the use of suitable doctor blades. Again, the consolidated sheet is fed into a Fitzpatrick comminuting machine wherein the sheet was ground and cut into particles which all passed through a 10-mesh screen.

The mix prepared in accordance with Examples 1 and 2 is transferred in suitable pans to the stencil lay-up equipment. By way of example, the clear mix of Example 1 and the white mix of Example 2 can be fed to suitable stricklers and then to stencils to form any desired pattern on a suitable carrier. The mix is consolidated in a suitable consolidating press using release paper between the press platen and the mix. By way of example, the temperature achieved during the consolidation of the mixes above described is about 275°–350° F. under a pressure of 140 p.s.i. At a temperature of 300° F. and pressure of 1,400 p.s.i., the dwell time in the press is approximately 15 seconds. A suitable floor product is thus formed comprised of a plastic sheet bonded to a carrier sheet, the plastic sheet having the design inlaid in accordance with the pattern laid by the stricklers and stencils, the mix produced in accordance with Example 1 forming a clear vinyl whereas the particles of mix formed in accordance with Example 2 form a white vinyl. A method and apparatus for use in forming molded, inlaid vinyl sheet goods using the plastic compositions of this invention is more fully set forth in United States Patent No. 2,024,203 to J. L. Berger.

It is readily evident that any desired colors may be achieved in the particles of plastic mix produced in accordance with this invention, and it will be readily evident to one skilled in the art that various batches of varying colored mixes can be easily mottled or fed as single colors to the stencils to form flooring products having a wide variety of designs, colors, and desired embossed effects. Design elements varying from transparent to opaque are also readily achieved by varying the filler-pigment content of the mix.

I claim:

1. A method of forming particles of plastic mix, which particles are both compressible and cohesive, comprising mixing, in relative proportions, 100 parts by weight of powdered resin obtained by dispersion polymerization, from 33⅓%–66⅔% by weight of said powdered resin consisting of a member selected from the group consisting of copolymers of vinyl chloride and vinyl acetate containing less than about 5% by weight vinyl acetate, copolymers of vinyl chloride and vinylidene chloride and mixtures thereof and from 66⅔%–33⅓% by weight of said powdered resin consisting of a member selected from the group consisting of copolymers of vinyl chloride and vinyl acetate containing more than about 5% by weight vinyl acetate and mixtures thereof, from 20–50 parts by weight of liquid vinyl plasticizer, and from 0–150 parts by weight of inert pigment and filler, said mixing being done at a temperature less than about 130° F., to form agglomerates of unfused resin, plasticizer, pigment, and filler, consolidating said agglomerates without fusing said resin component at a temperature less than about 130° F. to form a sheet of consolidated mix and disintegrating said sheet into particles of a desired degree of fineness while maintaining said particles and sheet at a temperature less than about 80° F.

2. A method in accordance with claim 1 in which the agglomerates of resin, plasticizer, pigment, and filler are consolidated into sheet form by passing said agglomerates of mix between cooled consolidating rolls driven at equal speeds.

3. A method in accordance with claim 1 in which the member selected from the group consisting of copolymers of vinyl chloride and vinyl acetate containing more than about 5% by weight vinyl acetate is a copolymer containing about 14% by weight vinyl acetate.

References Cited in the file of this patent

UNITED STATES PATENTS

| | | |
|---|---|---|
| 2,024,203 | Berger | Dec. 17, 1935 |
| 2,319,040 | Conklin | May 11, 1943 |
| 2,531,739 | Orsini | Nov. 28, 1950 |
| 2,714,076 | Seckel | July 26, 1955 |
| 3,000,754 | Zentmyer | Sept. 19, 1961 |
| 3,015,640 | Weaver et al. | Jan. 2, 1962 |